(12) United States Patent
Lv

(10) Patent No.: US 9,357,527 B2
(45) Date of Patent: May 31, 2016

(54) CARRIER AGGREGATION SCHEDULING APPARATUS, CARRIER AGGREGATION SCHEDULING METHOD, AND BASE STATION

(71) Applicant: Huawei Technologies Co., LTD, Shenzhen (CN)

(72) Inventor: Xinyan Lv, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 298 days.

(21) Appl. No.: 13/919,469

(22) Filed: Jun. 17, 2013

(65) Prior Publication Data

US 2013/0279446 A1   Oct. 24, 2013

Related U.S. Application Data

(63) Continuation of application No. PCT/CN2011/082353, filed on Nov. 17, 2011.

(51) Int. Cl.
   *H04W 72/04*   (2009.01)
   *H04L 5/00*    (2006.01)
   *H04W 72/12*   (2009.01)

(52) U.S. Cl.
   CPC .............. *H04W 72/04* (2013.01); *H04L 5/001* (2013.01); *H04L 5/0091* (2013.01); *H04L 5/0094* (2013.01); *H04W 72/1278* (2013.01)

(58) Field of Classification Search
   CPC ............ H04W 72/04; H04W 72/1278; H04W 5/0094; H04W 5/0091; H04W 5/001
   USPC .................................. 370/329, 252; 455/422.1
   See application file for complete search history.

(56) References Cited

U.S. PATENT DOCUMENTS

| 2010/0142461 | A1 | 6/2010 | Miki et al. |
| 2011/0103243 | A1* | 5/2011 | Larsson et al. ............... 370/252 |
| 2011/0105107 | A1* | 5/2011 | Kwon et al. ............... 455/422.1 |
| 2011/0243008 | A1* | 10/2011 | Kim ...................... H04L 1/1893 370/252 |

FOREIGN PATENT DOCUMENTS

| CN | 102014494 | | 4/2011 |
| EP | 2341678 | A1 | 7/2011 |
| EP | 2485549 | A1 | 8/2012 |
| RU | 2009136527 | A | 4/2011 |
| WO | 2007024936 | A2 | 3/2007 |

OTHER PUBLICATIONS

Extended European Search Report received in Application No. 11867278.1-1854 mailed Feb. 24, 2014, 7 pages.

* cited by examiner

*Primary Examiner* — Kwang B Yao
*Assistant Examiner* — Syed M Bokhari
(74) *Attorney, Agent, or Firm* — Slater Matsil, LLP

(57) ABSTRACT

A carrier aggregation apparatus includes a first carrier aggregation scheduler, which is configured to receive user information of a first user equipment UE, carrier information for carrier aggregation, and information about a first baseband board and to schedule carriers according to the user information of the first UE, the carrier information for carrier aggregation, and the information about the first baseband board. The scheduling result indicates carriers used for the first UE.

8 Claims, 9 Drawing Sheets

CARRIER AGGREGATION SCHEDULING APPARATUS, CARRIER AGGREGATION SCHEDULING METHOD, AND BASE STATION

CROSS-REFERENCE TO RELATED APPLICATIONS

This application is a continuation of International Application No. PCT/CN2011/082353, filed on Nov. 17, 2011, which is hereby incorporated by reference in its entirety.

TECHNICAL FIELD

The present invention relates to the field of mobile communications technologies, and in particular, to a technical solution for allocating multi-carrier resources.

BACKGROUND

With increasingly growing requirements of mobile broadband data services, for a broadband radio access network, a wireless communication system with a large number of spectrum resources of adjacent radio frequencies needs to be deployed. In addition, after the wireless communication system is deployed, with the increasing requirement of a higher data rate, the requirement of the performance of the broadband radio access network is also improved. For example, a broadband video requires a large amount of bandwidth, but it is increasingly difficult to provide such bandwidth using limited radio frequency spectrum resources generally allocated to the wireless communication system. In addition, more and more users are transferring to the wireless communication system to obtain its communication services. This may increase the load of the wireless communication system and may further reduce the bandwidth available for each user or the available bandwidth of the whole wireless communication system. Therefore, it is necessary to improve the performance of the wireless communication system by more efficiently using the available radio frequency spectrum or available bandwidth of the device, network or system.

In the wireless communication system, each cell under a base station generally has only one carrier and a terminal is capable of receiving and sending data only in one cell (on one carrier) at a time. The carrier may be a component carrier (component carrier, CC for short), may occupy a part of the bandwidth of the wireless communication system, and may also be a minimum allocatable unit, for example, multiple time domains on multiple schedulable subcarriers in a subframe. In a Long Term Evolution system (LTE for short), the maximum bandwidth of a carrier is 20 MHz. In a Long Term Evolution-Advanced system (LTE-A for short), the peak rate ratio of the wireless communication system is greatly improved compared with that in the LTE, and requires that the downlink peak rate reaches 1 Gbps and the uplink peak rate reaches 500 Mbps. Therefore, the transmission bandwidth of 20 MHz cannot satisfy this requirement. To provide a higher transmission rate, the LTE-A adopts a carrier aggregation technology. The carrier aggregation technology refers to that a terminal is capable of combining multiple carriers and transmitting data on the carriers at the same time, thereby improving the data transmission rate. The bandwidth of each carrier does not exceed 20 MHz for ensuring that in the LTE-A, the terminal is capable of working under each aggregated carrier.

At present, how to properly schedule and allocate, to the terminal, carrier resources that can be aggregated is a main problem to be solved in the industry.

SUMMARY OF THE INVENTION

Embodiments of the present invention provide a carrier aggregation scheduling apparatus, a carrier aggregation scheduling method, and a base station, to solve the problem of how to properly and efficiently allocate multi-carrier resources to a terminal.

In one aspect, the present invention provides a carrier aggregation scheduling apparatus, including a first carrier aggregation scheduler, configured to receive user information of a first user equipment UE, carrier information for carrier aggregation, and information about a first baseband board, schedule carriers according to the user information of the first UE, the carrier information for carrier aggregation, and the information about the first baseband board, and output a scheduling result, where the scheduling result indicates carriers used for the first UE.

In another aspect, the present invention provides a carrier aggregation scheduling method, including receiving, by a carrier aggregation scheduling apparatus, user information of a UE, carrier information for carrier aggregation, and information about a baseband board, and scheduling, by the carrier aggregation scheduling apparatus, carriers according to the user information of the UE, the carrier information for carrier aggregation, and the information about the baseband board, and outputting a scheduling result, where the scheduling result indicates carriers used for the UE.

In still another aspect, the present invention provides a base station, including a first baseband board, configured to acquire user information of a first user equipment UE, and a first carrier aggregation scheduler, configured to receive user information of the first UE, carrier information for carrier aggregation, and information about the first baseband board, schedule carriers according to the user information of the first UE, the carrier information for carrier aggregation, and the information about the first baseband board, and output a scheduling result, where the scheduling result indicates carriers used for the first UE.

In still another aspect, the present invention provides a base station, including a carrier aggregation scheduling apparatus, configured to allocate carriers to a user equipment UE and transmit data between the UE and the base station based on the carriers, and a radio frequency processing unit, configured to process the data.

According to the carrier aggregation scheduling apparatus and method and the base station in the present invention, user information of a terminal, carrier information for carrier aggregation, and information about a baseband board are collected, and then different carries are scheduled and allocated to the terminal for properly allocating multi-carrier resources to the terminal.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
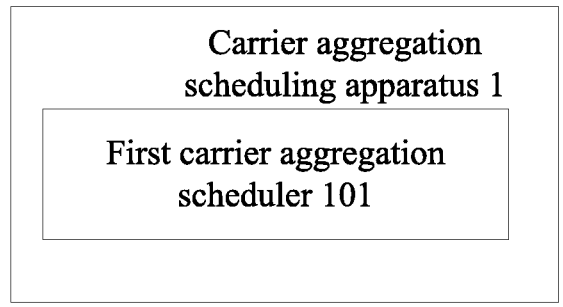
FIG. 1 is a schematic structural diagram of a carrier aggregation scheduling apparatus according to a first embodiment of the present invention.

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative effects shall fall within the protection scope of the present invention.

It should be understood by persons skilled in the art that the accompanying drawings are merely schematic diagrams of an exemplary embodiment, and modules or processes in the accompanying drawings are not necessarily required in implementing the present invention.

Various aspects of the present invention are described with reference to a terminal and/or a base station.

The terminal refers to a device providing voice and/or data connectivity for a user, and may be a wireless terminal or a wired terminal. The wireless terminal may be a handheld device with a wireless connection function or another processing device connected to a wireless modem, and is capable of communicating with one or multiple core networks through a radio access network. For example, the wireless terminal may be a mobile phone (or referred to as a "cellular" phone) or a computer with a mobile terminal. For another example, the wireless terminal may be a portable, pocket, handheld, computer-embedded, or vehicle-mounted mobile apparatus. For still another example, the wireless terminal may be a mobile station (mobile station), an access point (access point), or a user equipment (user equipment, UE for short). For ease of description, the above terminal is referred to as a UE in each of the embodiments of the present invention.

The base station may be a device that communicates with the wireless terminal through one or multiple cells on an air interface in an access network. For example, the base station may be a base transceiver station (base transceiver station, BTS for short) in the GSM or CDMA, a NodeB (NodeB) in the WCDMA, an evolved NodeB (evolutional Node B, eNB or e-NodeB for short) in the LTE, or a base station in a subsequently evolved network, which is not limited in the present invention.

In different embodiments of the present invention, the carrier aggregation technology is used on multiple carriers to increase available bandwidth of a wireless communication system and properly allocate bandwidth to a UE. Persons skilled in the art may understand that a downlink in this embodiment refers to a channel for a base station to transmit data to a UE, and an uplink refers to a channel for the UE to transmit data to the base station.

Each of the specific embodiments is described in detail below with reference to the accompanying drawings.

A first embodiment of the present invention provides a carrier aggregation scheduling apparatus 1, the main structure of which is shown in FIG. 1 and includes a first carrier aggregation scheduler 101, configured to receive user information of a first UE, carrier information for carrier aggregation, and information about a first baseband board, schedule carriers according to the user information of the first UE, the carrier information for carrier aggregation, and the information about the first baseband board, and output a scheduling result, where the scheduling result indicates carriers used for the first UE.

In this embodiment, when a base station transmits information to the first UE, the first carrier aggregation scheduler 101 schedules one or multiple downlink carriers and allocates such downlink carriers used for the first UE. When the first UE transmits information to the base station, the first carrier aggregation scheduler 101 schedules one or multiple uplink carriers and allocates such uplink carriers used for the first UE. For example, the first carrier aggregation scheduler 101 may use carriers with the same coverage or a coverage intersection the multiple downlink carriers and may also use carriers with the same coverage or a coverage intersection as the multiple uplink carriers. The first carrier aggregation scheduler 101 may schedule carriers according to bandwidth configuration of carriers in L3 of the radio protocol stack, power configuration of each carrier, periodical carrier load information, or the like, which is not limited in the present invention.

For example, the first carrier aggregation scheduler 101 is responsible for controlling uplink and downlink data transmission. When determining to schedule the UE, the first carrier aggregation scheduler 101 notifies, through a physical downlink control channel (physical downlink control channel, PDCCH for short), the first UE of the type of resources on which data is sent and received. The first UE monitors the PDCCH. When detecting that scheduling information sent by the base station is related to itself, according to an indication on the PDCCH, the first UE sends, on an uplink, uplink data to the base station or receives, on a downlink, downlink data sent by the base station.

Alternatively, the user information of the first UE may be the amount of data to be transmitted of the UE and air interface channel quality of the UE. For example, in the uplink, the air interface channel quality of the UE is the uplink air interface channel quality of the UE; and in the downlink, the air interface channel quality of the UE is the downlink air interface channel quality of the UE. For another example, in the downlink, the amount of data to be transmitted of the UE refers to the amount of data to be scheduled in a bearer of the UE maintained at the base station. The bearer corresponds to the amount of data cached in a packet data convergence protocol (packet data convergence protocol, PDCP for short) or radio link control (radio link control, RLC for short) layer; and in the uplink, the amount of data to be transmitted of the UE refers to the amount of data to be transmitted to the base station by the UE maintained at the base station.

Alternatively, the carrier information for carrier aggregation may be bandwidth of a carrier. When multiple carriers exist, the carrier information includes bandwidth information of the multiple carriers.

Alternatively, the first baseband board may be a system configured in the base station and used for baseband processing. The information about the first baseband board may be load of the baseband board or a resource constraint of the baseband board. For example, the load of the baseband board may be the utilization of a capital process unit (central process unit, CPU for short) on the first baseband board. The resource constraint of the baseband board may be a network interface rate, the carrier or UE processing capability, or the air interface resource processing capability of the first baseband board, which is not limited in the present invention.

Taking the downlink for example, the first carrier aggregation scheduler 101 acquires the amount of data to be transmitted of the UE, the downlink air interface channel quality of the UE, the bandwidth of different carriers, and the load and resource constraint of the baseband board, and then schedules and allocates the amount of data to be transmitted of the UE to different carriers. The scheduling procedure may be performed at each transmission time interval (transmission time interval, TTI for short) and may also be periodically performed at different TTIs. By scheduling the carriers, the first carrier aggregation scheduler 101 may directly allocate the amount of data to be transmitted of the UE to different carriers or indirectly allocate, by proportion, the amount of data to be transmitted of the UE to different carriers.

For example, when the amount of data to be transmitted of the UE is 100 bytes and can be allocated to two carriers, the first carrier aggregation scheduler 101 may allocate 60 bytes of the data to be transmitted to one carrier, and allocate the remaining 40 bytes of the data to be transmitted to the other carrier. For another example, the first carrier aggregation scheduler 101 may also allocate 60% of the amount of data to be transmitted of the UE to one carrier, and allocate the remaining 40% of the data to the other carrier.

In this embodiment, the first carrier aggregation scheduler may collect the user information of the first UE, the carrier information for carrier aggregation, and the information about the first baseband board, and dynamically schedule and allocate by time different carriers according to availability of base station resources, so as to adapt to change of the bandwidth requirement of the UE and dynamically balance bandwidth allocation, thereby maximizing the bandwidth utilization.

Figure 2:
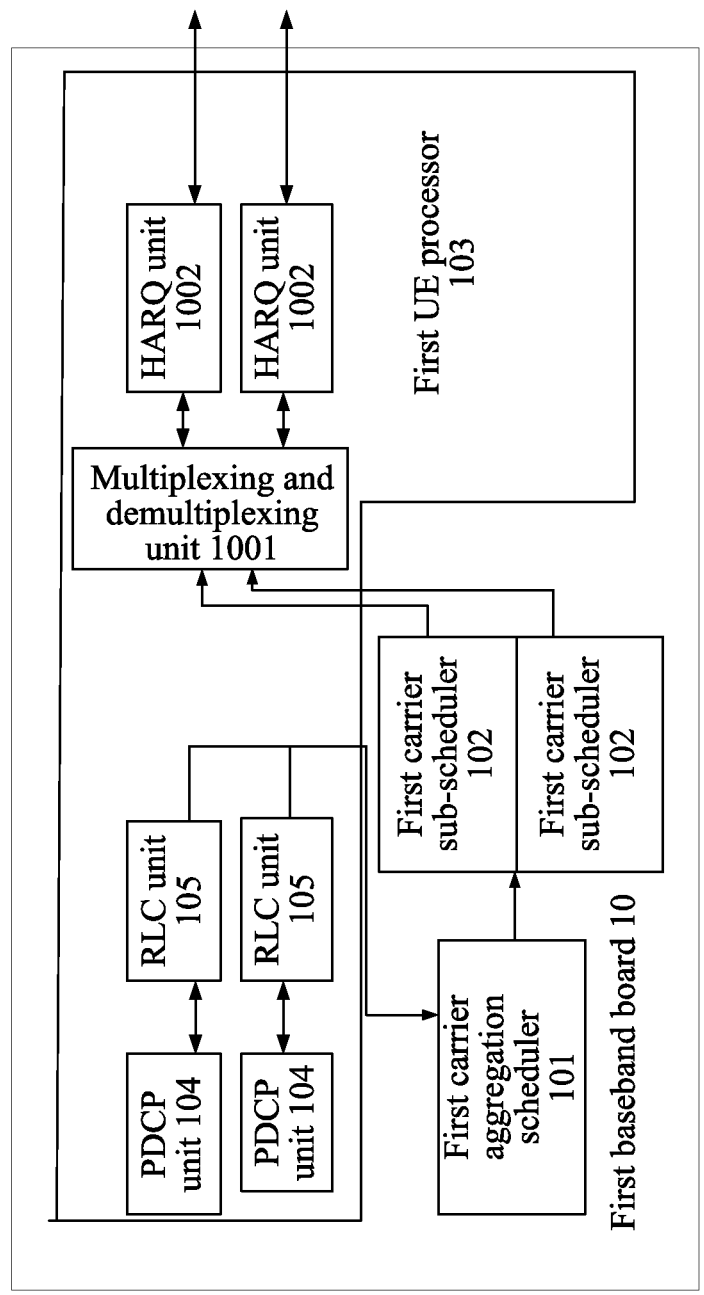
FIG. 2 is a schematic structural diagram of a carrier aggregation scheduling apparatus according to a second embodiment of the present invention.

In a second embodiment of the present invention, the carrier aggregation scheduling apparatus 1, as shown in FIG. 2, may further include a first carrier sub-scheduler 102, connected to the first carrier aggregation scheduler 101, where the first carrier sub-scheduler 102 is configured to schedule carrier resources of a first carrier according to the scheduling result of the first carrier aggregation scheduler 101, and the carriers used for the first UE include the first carrier.

In this embodiment, the carrier sub-scheduler 102 may schedule carrier resources of one or multiple carriers (the first carrier in this embodiment) among the different carriers. For example, the first carrier sub-scheduler 102 may schedule and allocate, according to the scheduling result sent by the first carrier aggregation scheduler 101, the bandwidth of the first carrier used for the first UE.

In this embodiment, the scheduling result is the amount of data to be transmitted of the UE that is allocated to the different carriers.

In this embodiment, one or multiple first carrier sub-schedulers 102 may be provided. For example, when multiple first carrier sub-schedulers 102 are provided, the carrier sub-schedulers may be connected to the first carrier aggregation scheduler 101 in parallel. For another example, the carrier sub-schedulers may be sequentially connected in series and connected to the first carrier aggregation scheduler 101 through one of the carrier sub-schedulers. In the downlink, each of the carrier sub-schedulers may collect the scheduling result of the first carrier aggregation scheduler 101, schedule its controlled carriers according to the air interface channel quality of the UE, the scheduling priority of the UE, the capability information of the UE, and the carrier information that are collected by each of the carrier sub-schedulers, and allocate the bandwidth of the carrier used for the UE among its controlled carriers.

In the uplink, each of the carrier sub-schedulers may collect the scheduling result of the first carrier aggregation scheduler 101, schedule its controlled carriers according to the air interface channel quality of the UE, the available power of the UE allocated to the different carriers, the scheduling priority of the UE, the capability information of the UE, and the carrier information that are collected by each of the carrier sub-schedulers, and allocate the bandwidth of the carrier used for the UE among its controlled carriers. The carrier information may be a power constraint, a frame number, or a subframe number. The power constraint may be determining, according to the user information of the UE, different power of the carriers scheduled by the UE. The frame number or subframe number may be used to determine the current air interface time.

In this embodiment, the carrier aggregation scheduling apparatus 1 may further include a first baseband board 10. The first baseband board 10 may include a first UE processor 103, configured to acquire the user information of the first UE, where the first UE processor is connected to the first carrier aggregation scheduler.

Alternatively, one or multiple first UE processors 103 may be provided. For example, when multiple first UE processors 103 are provided, each of the UE processors is connected to the first carrier aggregation scheduler 101, so that the first carrier aggregation scheduler 101 is enabled to receive the user information of each of the UEs, schedule the different carriers according to the user information of each of the UEs, the carrier information for carrier aggregation, and the information about the baseband board, and determine carriers used for the different UEs.

Alternatively, the first carrier sub-scheduler 102 or the first carrier aggregation scheduler 101 may be located on the first baseband board 10 and directly communicate with the first baseband board 10, and may also not be located on the first baseband board 10 and indirectly communicate with the first baseband board 10 through an interface, an intelligent platform, or the like, which is not limited in the present invention.

Alternatively, the first carrier aggregation scheduler 101 may be located on the first UE processor 103. Therefore, the first carrier aggregation scheduler 101 collects the user information of the first UE rather than user information of other UEs, schedules the different carriers according to the user information of the first UE, the carrier information for carrier aggregation, and the information about the first baseband board, and determines carriers used for the first UE. In this case, each of the carriers for carrier aggregation may also have the same coverage or a coverage intersection.

In this embodiment, the carrier aggregation scheduling apparatus 1 may further include a first packet data convergence protocol PDCP unit 104 and a first radio link control RLC unit 105, where both the first PDCP unit 104 and the first RLC unit 105 are configured to process the user information of the first UE and generate RLC protocol data unit PDU information. The first PDCP unit 104 is connected to the first RLC unit 105 and the first RLC unit 105 is connected to the first carrier aggregation scheduler 101. The first carrier aggregation scheduler 101 is further configured to process the amount of data to be transmitted of the first UE that is sent by the PDCP unit or the RLC unit, and allocate the amount of data to be transmitted to different first subcarrier processors, so that each of the first subcarrier processors is enabled to schedule, according to information such as the allocated amount of data to be transmitted, its controlled carrier resources used for the first UE.

Alternatively, the first PDCP unit 104 and the first RLC unit 105 may be located on the first UE processor 103.

Alternatively, one or multiple first PDCP units 104 and first RLC units 105 may be provided, and the number of the first PDCP units 104 is identical with that of the first RLC units 105. For example, when multiple first PDCP units 104 and first RLC units 105 are provided, each of the first PDCP units 104 is connected to each of the first RLC units 105, and all the first RLC units 105 are connected to the first carrier aggregation scheduler 101. The scheduling priority of the UE in the scheduling result may be used to determine priorities of processing, by the first UE processor 103, the user information of the UE through the different first PDCP units 104 and first RLC units 105.

In this embodiment, the first UE processor 103 further includes a first media access control MAC unit (not shown), configured to receive the RLC PDU information and process the RLC PDU information.

A first end of the first MAC unit is connected to the first carrier sub-scheduler 102, and a second end of the first MAC unit is connected to a first baseband processing unit (not shown).

Alternatively, the first baseband processing unit is located on the first baseband board 10.

Alternatively, the first MAC unit includes a first multiplexing and demultiplexing unit 1001 that is configured to multiplex or demultiplex the RLC PDU information for the uplink and downlink. The first MAC unit also includes a first hybrid automatic repeat-request (HARQ) unit 1002, configured to detect or automatically correct the RLC PDU information.

In this embodiment, the number of the first HARQ units 1002 is identical with that of the carriers.

In this embodiment, the first carrier sub-scheduler may schedule and allocate bandwidth on carriers in a distributed mode according to the scheduling result sent by the first carrier aggregation scheduler and break a processing bottleneck by using two-level scheduling, so as to adapt to change of the bandwidth requirement of the UE and dynamically balance bandwidth allocation, thereby maximizing the bandwidth utilization.

Figure 3:
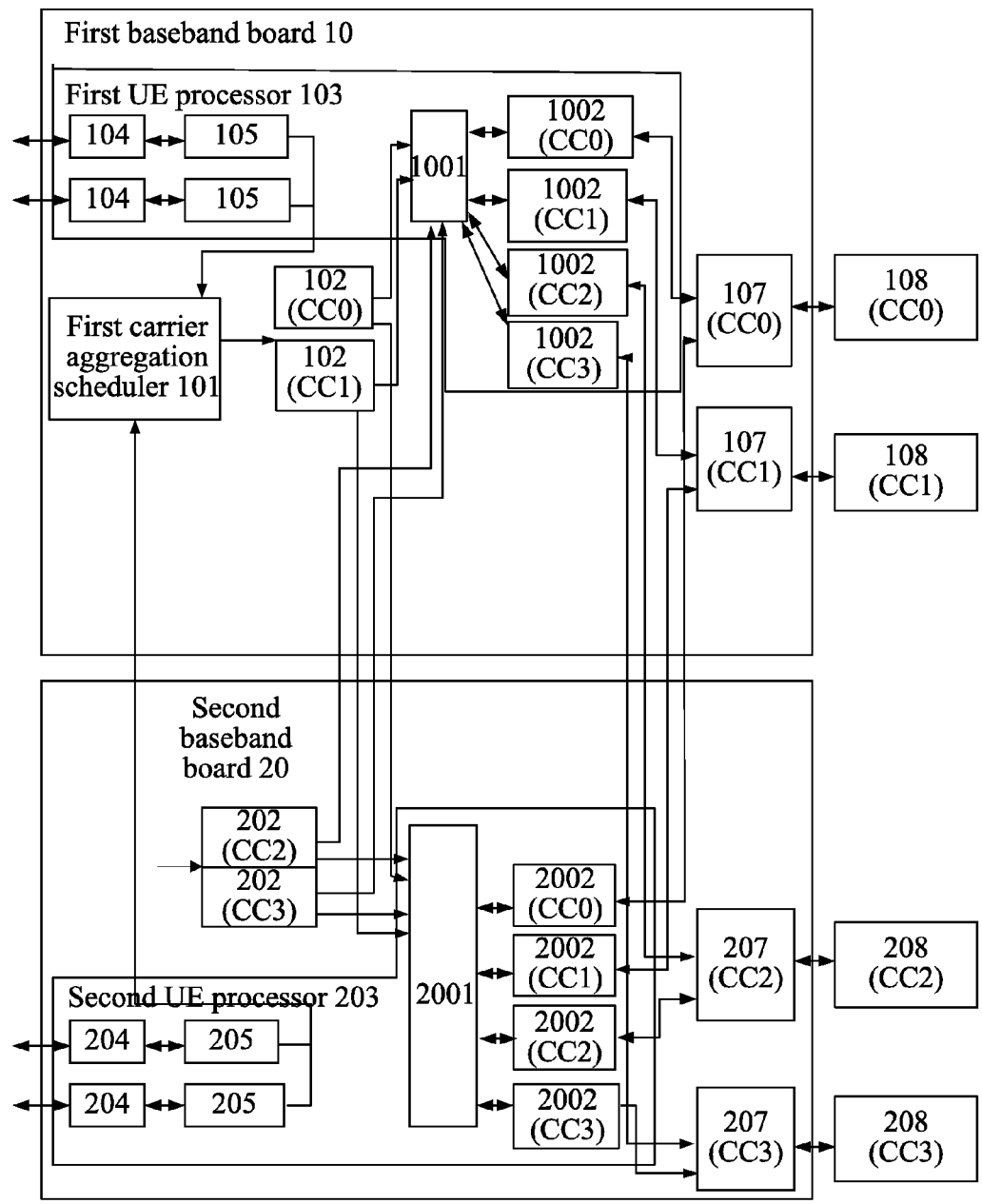
FIG. 3 is a schematic structural diagram of a carrier aggregation scheduling apparatus according to a third embodiment of the present invention.

In a third embodiment of the present invention, as shown in FIG. 3, the carrier aggregation scheduling apparatus 1 may further include a second baseband board 20, including a second UE processor 203, connected to the first carrier aggregation scheduler 101, where the first carrier aggregation scheduler 101 schedules the carriers according to user information of a second UE, the carrier information for carrier aggregation, and information about the second baseband board and determines carriers used for the second UE. The second UE processor 203 is configured to acquire the user information of the second UE.

Alternatively, the second baseband board 20 further includes a second carrier sub-scheduler 202, connected to the first carrier aggregation scheduler 101, where the second carrier sub-scheduler 202 is configured to schedule resources of a second carrier according to a scheduling result of the first carrier aggregation scheduler 101.

Alternatively, the carriers used for the first UE or the second UE include the first carrier and/or the second carrier.

In this embodiment, more than two baseband boards may be provided, which is not limited in the present invention.

In this embodiment, the second baseband board 20 may further include a packet data convergence protocol PDCP unit 204 and a radio link control RLC unit 205, where both the PDCP unit 204 and the RLC unit 205 are configured to process the user information of the second UE and generate RLC protocol data unit PDU information. The PDCP unit 204 is connected to the RLC unit 205 and the RLC unit 205 is connected to the first carrier aggregation scheduler 101. The first carrier aggregation scheduler 101 is further configured to process the amount of data to be transmitted of the second UE that is sent by the PDCP unit or the RLC unit, and allocate the amount of data to be transmitted to different second subcarrier processors, so that each of the second subcarrier processors is enabled to schedule, according to information such as the allocated amount of data to be transmitted, its controlled carrier resources used for the first UE or the second UE. The RLC unit 205 is adapted to process data on the downlink by connecting to the first carrier aggregation scheduler 101.

Alternatively, the PDCP unit 204 and the RLC unit 205 may be located on the second UE processor 203.

Alternatively, one or multiple PDCP units 204 and RLC units 205 may be provided, and the number of the PDCP units 204 is identical with that of the RLC units 205. For example, when multiple PDCP units 204 and RLC units 205 are provided, each of the PDCP units 204 is connected to each of the RLC units 205, and all the RLC units 205 are connected to the first carrier aggregation scheduler 101. The scheduling priority of the second UE in the scheduling result may be used to determine priorities of processing, by the second UE processor 203, the user information of the second UE through the different PDCP units 204 and RLC units 205.

In this embodiment, the second UE processor 203 may further include a media access control MAC unit (not shown), configured to receive the RLC PDU information of the second UE and process the RLC PDU information of the second UE.

A first end of the MAC unit is connected to the second carrier sub-scheduler 202, and a second end of the MAC unit is connected to a baseband processing unit 207.

Alternatively, the baseband processing unit 207 is located on the second baseband board 20.

In this embodiment, in the downlink, the baseband processing unit 107/207 may send the processed information to a radio frequency processing unit 108/208 respectively. Likewise, in the uplink, the radio frequency processing unit 108/208 may send the processed information to the baseband processing unit 107/207 respectively.

Alternatively, the MAC unit includes a multiplexing and demultiplexing unit 2001, configured to multiplex or demultiplex the RLC PDU information for the uplink and downlink, and a hybrid automatic repeat-request (hybrid automatic repeat-request, HARQ for short) unit 2002, configured to detect or automatically correct the RLC PDU information.

The following describes this embodiment in detail with reference to a processing procedure, where the baseband boards process four carriers (called CC0-CC3 respectively for ease of description), the first baseband board 10 processes CC0 and CC1, and the second baseband board 20 processes CC2 and CC3.

The processing procedure on the downlink is as follows.

The first carrier aggregation scheduler 101 schedules and collects the amount of data to be transmitted that is specifically borne by different UEs (the first UE and the second UE), downlink air interface channel quality of the different UEs, bandwidth of different carriers, load information of the first baseband board 10, and load information of the second baseband board 20, and then distributes the amount of data to be transmitted of each of the UEs to the different carriers for scheduling.

For the above deployment, information such as the amount of data to be transmitted of the second UE, the downlink air interface channel quality information, and the load bandwidth of CC2/CC3 on the second baseband board 20 needs to be transmitted to the first carrier aggregation scheduler 101 in an inter-board mode. The first carrier aggregation scheduler 101 may acquire information such as the amount of data to be transmitted of the first UE, the downlink air interface channel quality information, and the load bandwidth of CC0/CC1 on the first baseband board 10 in a memory sharing or message mode.

The scheduling result of the first carrier aggregation scheduler 101 is provided for each of the carrier sub-schedulers to independently schedule carrier resources. Each of the carrier sub-schedulers may need to input the following information for scheduling each of the carriers: the air interface channel quality of each of the UEs, the amount of data to be transmitted that is allocated by each of the UEs to each of the carriers, the scheduling priority of each of the UEs, the capability information of each of the UEs, and the carrier information.

For example, the first carrier aggregation scheduler 101 sends, through the PDCP unit or the RLC unit, the amount of data to be transmitted of the UE on each of the carriers to the carrier sub-scheduler (102/202) corresponding to each of the carriers. Each of the carrier sub-schedulers schedules its controlled carriers according to the air interface channel quality of the UE, the scheduling priority of the UE, the capability information of the UE, and the carrier information that are collected by each of the carrier sub-schedulers as well as the amount of data to be transmitted that is sent by the first carrier aggregation scheduler, so that RLC layers or RLC and PDCP layers of the first UE and the second UE are enabled to perform packet processing, form the RLC PDU information, and then transmit the RLC PDU information to the MAC units of the different UEs for multiplexing and HARQ processing.

In this embodiment, a scheduling result of each of the carrier sub-schedulers is that different UEs are instructed through a PDCCH channel to transmit data on different carriers. For example, the carrier sub-scheduler 202 of CC2/CC3 needs to perform inter-board transmission for scheduling of the first UE, and the carrier sub-scheduler 102 of CC0/CC1 does not need to perform inter-board transmission for scheduling of the first UE.

The carrier sub-scheduler 102 of CC0/CC1 does not need to perform inter-board transmission when acquiring the user information of the first UE, but needs to perform inter-board transmission when acquiring the user information of the second UE Likewise, the carrier sub-scheduler 202 of CC2/CC3 does not need to perform inter-board transmission when acquiring the user information of the second UE, but needs to perform inter-board transmission when acquiring the user information of the first UE.

The MAC unit of the UE multiplexes, on each of the carriers, one or multiple pieces of RLC PDU information of the UE and generates MAC PDU information on each of the carriers. Different carriers have independent HARQ units to complete HARQ processing.

For the above deployment, the RLC PDU information generally does not need to be transmitted between boards. If the PDCP unit/RLC unit and the MAC unit of the UE support inter-board deployment, the RLC PDU information also supports inter-board transmission.

The MAC PDU information of the UE on different carriers is transmitted to the different baseband processing units (107/207) for processing.

For the above deployment, the MAC PDU information needs to be transmitted between boards. For example, information related to HARQ processing of the first UE on CC2 needs to be transmitted to the second baseband board 20 in an inter-board mode, whereas information related to HARQ processing of the first UE on CC0 does not need to be transmitted between boards.

In the uplink direction, the first carrier aggregation scheduler 101 collects the amount of data to be transmitted that is specifically borne by different UEs (the first UE and the second UE), uplink air interface channel quality of the different UEs, capability information of the different UEs, bandwidth of different carriers, the load information of the first baseband board 10, and the load information of the second baseband board 20, and then distributes the amount of data to be transmitted of each of the UEs and uplink power of the UEs to the different carriers for scheduling.

For the above deployment, information such as the amount of data to be transmitted of the second UE, the uplink air interface channel quality information, the capability information of the second UE, and the bandwidth of CC2/CC3 on the second baseband board 20 needs to be transmitted to the first carrier aggregation scheduler 101 in an inter-board mode. The first carrier aggregation scheduler 101 may acquire information such as the amount of data to be transmitted of the first UE, the uplink air interface channel quality information, the capability information of the first UE, and the bandwidth of CC0/CC1 on the first baseband board 10 in a memory sharing or message mode.

The scheduling result of the first carrier aggregation scheduler 101 is provided for each of the carrier sub-schedulers to independently schedule carrier resources. Each of the carrier sub-schedulers may need to input the following information for scheduling each of the carriers: the air interface channel quality of each of the UEs, the amount of data to be transmitted that is allocated by each of the UEs to each of the carriers, the available power allocated by each of the UEs to each of the carriers, the scheduling priority of each of the UEs, the capability information of each of the UEs, and the carrier information.

The carrier sub-scheduler 102 of CC0/CC1 does not need to perform inter-board transmission when acquiring the user information of the first UE, but needs to perform inter-board transmission when acquiring the user information of the second UE Likewise, the carrier sub-scheduler 202 of CC2/CC3 does not need to perform inter-board transmission when acquiring the user information of the second UE, but needs to perform inter-board transmission when acquiring the user information of the first UE.

The first carrier aggregation scheduler collects the amount of uplink data to be transmitted that is sent by different UEs to a base station. Information about the data to be transmitted may be acquired by using a priority bit rate (priority bit rate, PBR for short) configured for the UE, a buffer status request (buffer status request, BSR) reported by the UE, or a schedule request (schedule request, SR for short) reported by the UE. Each of the carrier sub-schedulers schedules its controlled carriers according to the air interface channel quality of the UE, the scheduling priority of the UE, the capability information of the UE, the available power allocated by each of the UEs to each of the carriers, and the carrier information that are collected by each of the carrier sub-schedulers as well as the amount of data to be transmitted that is sent by the first carrier aggregation scheduler.

In this embodiment, a scheduling result of the carrier sub-scheduler 102/202 of CC0-CC3 may be sent to different UEs through an air interface, so that each of the UEs is enabled to transmit data on different carriers. For example, the carrier sub-scheduler 202 of CC2 needs to transmit the scheduling result of the first UE between boards, whereas the carrier sub-scheduler 102 of CC0 does not need to transmit the scheduling result of the first UE between boards.

The baseband processing units (107/207) parse the uplink data of the UE and then send the uplink data to the first and second UE processors (103/203) for processing. Different carriers have independent HARQ units to complete HARQ processing.

For the above deployment, the MAC PDU information needs to be transmitted between boards. For example, the MAC PDU information of the first UE on CC2 is acquired from the baseband processing unit on the second baseband board 20, and processed by a demultiplexing unit to obtain RLC PDU information of the UE on different carriers; the obtained RLC PDU information is then sent to the RLC unit for processing.

For the above deployment, the RLC PDU information generally does not need to be transmitted between boards. If the RLC unit/PDCP unit and the MAC unit of the UE support inter-board deployment, the RLC PDU information may also be transmitted between boards.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and balance bandwidth allocation, thereby maximizing the bandwidth utilization.

Figure 4:
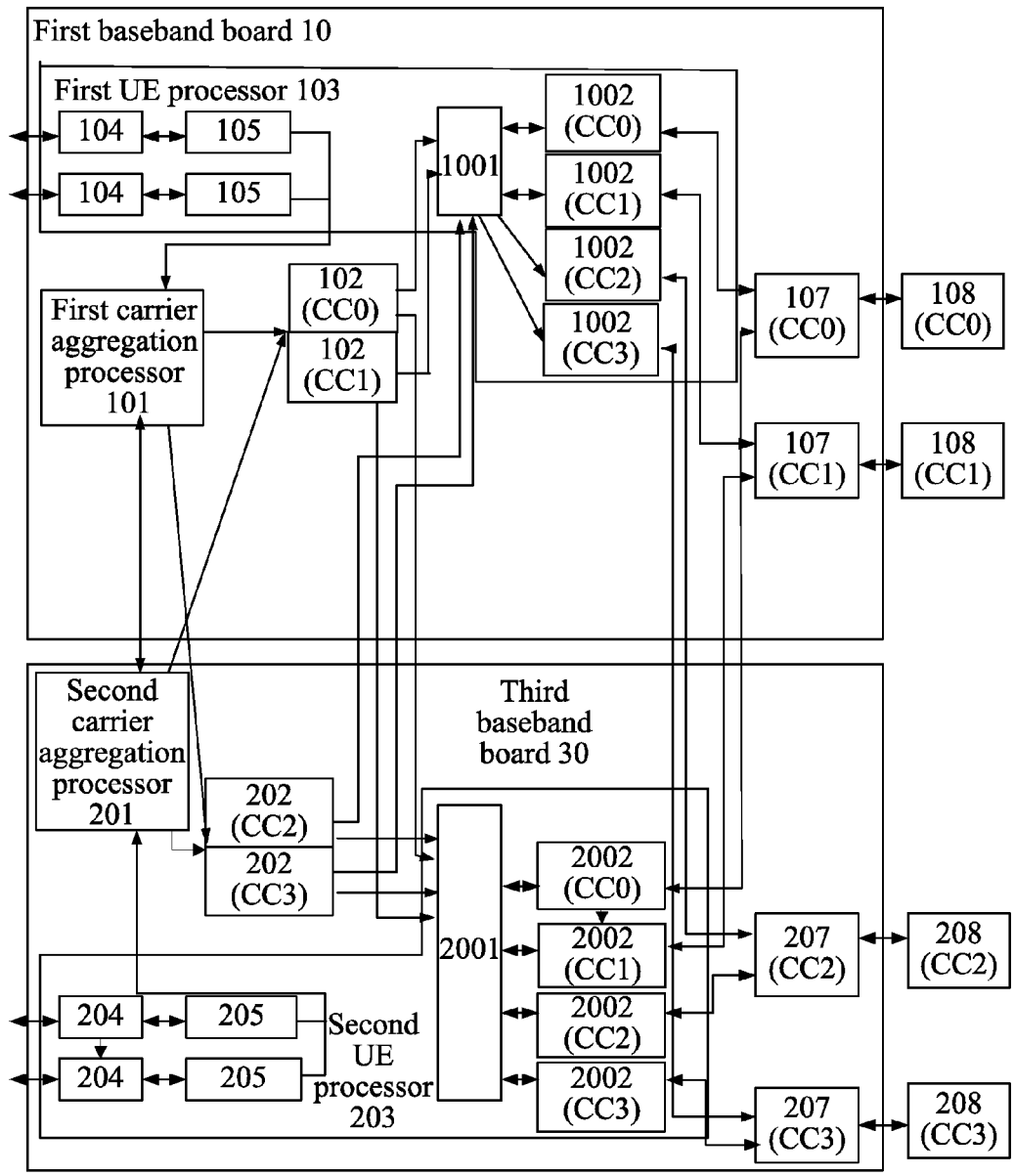
FIG. 4 is a schematic structural diagram of a carrier aggregation scheduling apparatus according to a fourth embodiment of the present invention.

In a fourth embodiment of the present invention, as shown in FIG. 4, the carrier aggregation scheduling apparatus 1 may further include a third baseband board 30, including a second UE processor 203, configured to acquire user information of a second UE, and a second carrier aggregation scheduler 201, connected to the second UE processor 203 and the first carrier aggregation scheduler 101, and configured to schedule the carriers according to the user information of the second UE, the carrier information for carrier aggregation, and information about the third baseband board and determine carriers used for the second UE.

Alternatively, the first carrier aggregation scheduler 101 and the second carrier aggregation scheduler 201 implement signaling interaction through connection, so that the first carrier aggregation scheduler 101 is enabled to further acquire carrier load information of the third baseband board 30, schedule the carriers according to the carrier load information of the third baseband board 30, and determine carriers used for the first UE; and the second carrier aggregation scheduler 201 is enabled to further receive carrier load information of the first baseband board, schedule the carriers according to the carrier load information of the first baseband board, and determine carriers used for the second UE.

Alternatively, the first carrier aggregation scheduler 101 or the second carrier aggregation scheduler 201 may also schedule a UE on a baseband board where a carrier sub-scheduler (this carrier sub-scheduler is configured to schedule a main carrier of the UE) is located. The UE acquires information about the main carrier in a random access mode.

In this embodiment, the first carrier aggregation scheduler 101 and the second carrier aggregation processor 201 coordinate different carriers on the first baseband board 10 and the third baseband board 30 by using signaling interaction. For example, the first carrier aggregation processor 101 may send its scheduling result to the second carrier aggregation processor 201 to notify the second carrier aggregation processor 201 of load information of carriers (CC0/CC1) on the first baseband board, so that the second carrier aggregation processor 201 is enabled to properly schedule the first carrier sub-scheduler 102 and the second carrier sub-processor 202 according to the load information of the carriers (CC0/CC1).

In this embodiment, when multiple UE processors 203 are provided, each of the UE processors 203 is connected to the carrier aggregation scheduler 201, so that the carrier aggregation scheduler 201 is enabled to receive the user information of each of the UEs, schedule the different carriers according to the user information of each of the UEs, the carrier information for carrier aggregation, and the information about the baseband board, and determine carriers used for the different UEs.

Alternatively, the third baseband board 30 further includes a second carrier sub-scheduler 202, connected to the first carrier aggregation scheduler 101 and the second carrier aggregation scheduler 201, where the second carrier sub-scheduler 202 is configured to schedule resources of a second carrier according to scheduling results of the first carrier aggregation scheduler 101 and the second carrier aggregation scheduler 201.

Alternatively, the first carrier sub-scheduler 102 is connected to the second carrier aggregation scheduler 201 and further configured to schedule resources of the first carrier according to the scheduling result of the second carrier aggregation scheduler 201.

In this embodiment, the carriers used for the first UE or the second UE include the first carrier and/or the second carrier.

In this embodiment, the third baseband board 30 may further include a packet data convergence protocol PDCP unit 204, a radio link control RLC unit 205, a media access control MAC unit, and a baseband processing unit 207 as described in the third embodiment. Different from the third embodiment, in the downlink, the RLC unit 205 is connected to the second carrier aggregation processor 201.

The difference between the processing procedure in the downlink direction in this embodiment and that in the third embodiment lies in that the first carrier aggregation scheduler 101 and the second carrier aggregation scheduler 201 may respectively schedule and collect the amount of data to be transmitted that is specifically borne by the first UE and the second UE, downlink air interface channel quality of the different UEs, bandwidth of different carriers, the load information of the first baseband board 10, and the load information of the second baseband board 20, and then distribute the amount of data to be transmitted of the different UEs to the different carriers for scheduling.

For the above deployment, the amount of data to be transmitted of the second UE and the downlink air interface channel quality information on the second baseband board 20 do not need to be transmitted to the first carrier aggregation scheduler 101 in an inter-board mode, but information such as the load bandwidth of CC2/CC3 needs to be transmitted to the first carrier aggregation scheduler 101 in an inter-board mode.

The difference between the processing procedure in the uplink direction in this embodiment and that in the third embodiment lies in that the first carrier aggregation scheduler 101 and the second carrier aggregation scheduler 201 respectively collect the amount of data to be transmitted that is specifically borne by different UEs (the first UE and the second UE), uplink air interface channel quality of the different UEs, capability information of the different UEs, bandwidth of different carriers, the load information of the first baseband board 10, and the load information of the second baseband board 20, and then distribute the amount of data to be transmitted of each of the UEs and uplink power of the UEs to the different carriers for scheduling.

For the above deployment, the amount of data to be transmitted of the second UE and the uplink air interface channel quality information on the second baseband board 20 do not need to be transmitted to the first carrier aggregation scheduler 101 in an inter-board mode, but information such as the load bandwidth of CC2/CC3 needs to be transmitted to the first carrier aggregation scheduler 101 in an inter-board mode.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and dynamically balance bandwidth allocation, thereby maximizing the bandwidth utilization. In addition, carrier aggregation schedulers are configured on different baseband boards, which may reduce the processing capability requirement of each of the carrier aggregation schedulers, and load balance between baseband boards is achieved through symmetric deployment of the different baseband boards.

Figure 5:
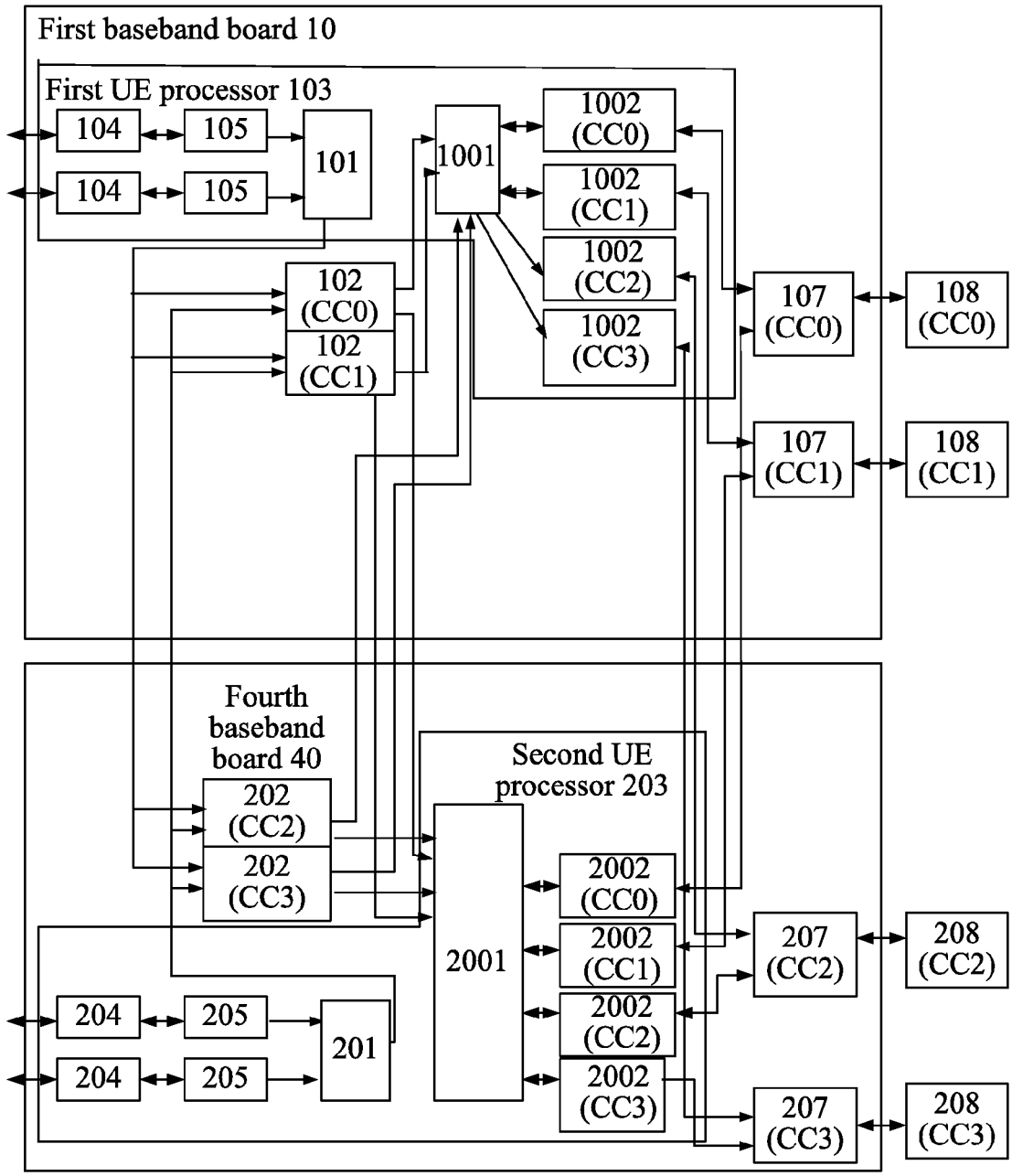
FIG. 5 is a schematic structural diagram of a carrier aggregation scheduling apparatus according to a fifth embodiment of the present invention.

In a fifth embodiment of the present invention, as shown in FIG. 5, the carrier aggregation scheduling apparatus 1 may further include a fourth baseband board 40, including a second UE processor 203, configured to acquire user information of a second UE, and a second carrier aggregation scheduler 201, located on the second UE processor 203, and configured to schedule the carriers according to the user information of the second UE, the carrier information for carrier aggregation, and information about the fourth baseband board and determine carriers used for the second UE.

Alternatively, the fourth baseband board 40 further includes a second carrier sub-scheduler 202, connected to the first carrier aggregation scheduler 101 and the second carrier aggregation scheduler 201, where the second carrier sub-scheduler 202 is configured to schedule resources of a second carrier according to scheduling results of the first carrier aggregation scheduler 101 and the second carrier aggregation scheduler 201.

Alternatively, the first carrier sub-scheduler 101 is connected to the second carrier aggregation scheduler 201 and further configured to schedule resources of the first carrier according to the scheduling result of the second carrier aggregation scheduler.

In this embodiment, the carriers used for the first UE or the second UE include the first carrier and/or the second carrier.

In this embodiment, the fourth baseband board 40 may further include a packet data convergence protocol PDCP unit 204, a radio link control RLC unit 205, a media access control MAC unit, and a baseband processing unit 207 as described in the third embodiment. Different from the third embodiment, when the base station sends downlink data to the UE, the RLC unit 205 is connected to the second carrier aggregation processor 201.

The difference between the processing procedure in the downlink direction in this embodiment and that in the third embodiment lies in that the first carrier aggregation scheduler 101 and the second carrier aggregation scheduler 201 are respectively deployed on the first UE processor 103 and the second UE processor 203, to respectively schedule and collect the amount of data to be transmitted that is specifically borne by the first UE and the second UE, downlink air interface channel quality of the different UEs, bandwidth of different carriers, the load information of the first baseband board 10, and the load information of the second baseband board 20, and then distribute the amount of data to be transmitted of each of the UEs to the different carriers for scheduling.

For the above deployment, the amount of data to be transmitted of the second UE and the downlink air interface channel quality information on the second baseband board 20 do not need to be transmitted to the first carrier aggregation scheduler 101 in an inter-board mode, but information such as the load bandwidth of CC2/CC3 needs to be transmitted to the first carrier aggregation scheduler 101 in an inter-board mode.

The difference between the processing procedure in the uplink direction in this embodiment and that in the third embodiment lies in that the first carrier aggregation scheduler 101 and the second carrier aggregation scheduler 201 are respectively deployed on the first UE processor 103 and the second UE processor 203, to respectively collect the amount of data to be transmitted that is specifically borne by different UEs (the first UE and the second UE), uplink air interface channel quality of the different UEs, capability information of the different UEs, bandwidth of different carriers, the load information of the first baseband board 10, and the load information of the second baseband board 20, and then distribute the amount of data to be transmitted of each of the UEs and uplink power of the UEs to the different carriers for scheduling.

For the above deployment, the amount of data to be transmitted of the second UE and the uplink air interface channel quality information on the second baseband board 20 do not need to be transmitted to the first carrier aggregation scheduler 101 in an inter-board mode, but information such as the load bandwidth of CC2/CC3 needs to be transmitted to the first carrier aggregation scheduler 101 in an inter-board mode.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and dynamically balance bandwidth allocation, thereby maximizing the bandwidth utilization. In addition, carrier aggregation schedulers are configured on different UE processors, which may further reduce the processing capability requirement of each of the carrier aggregation schedulers, and load balance between baseband boards is achieved through symmetric deployment of the different baseband boards.

Figure 6:
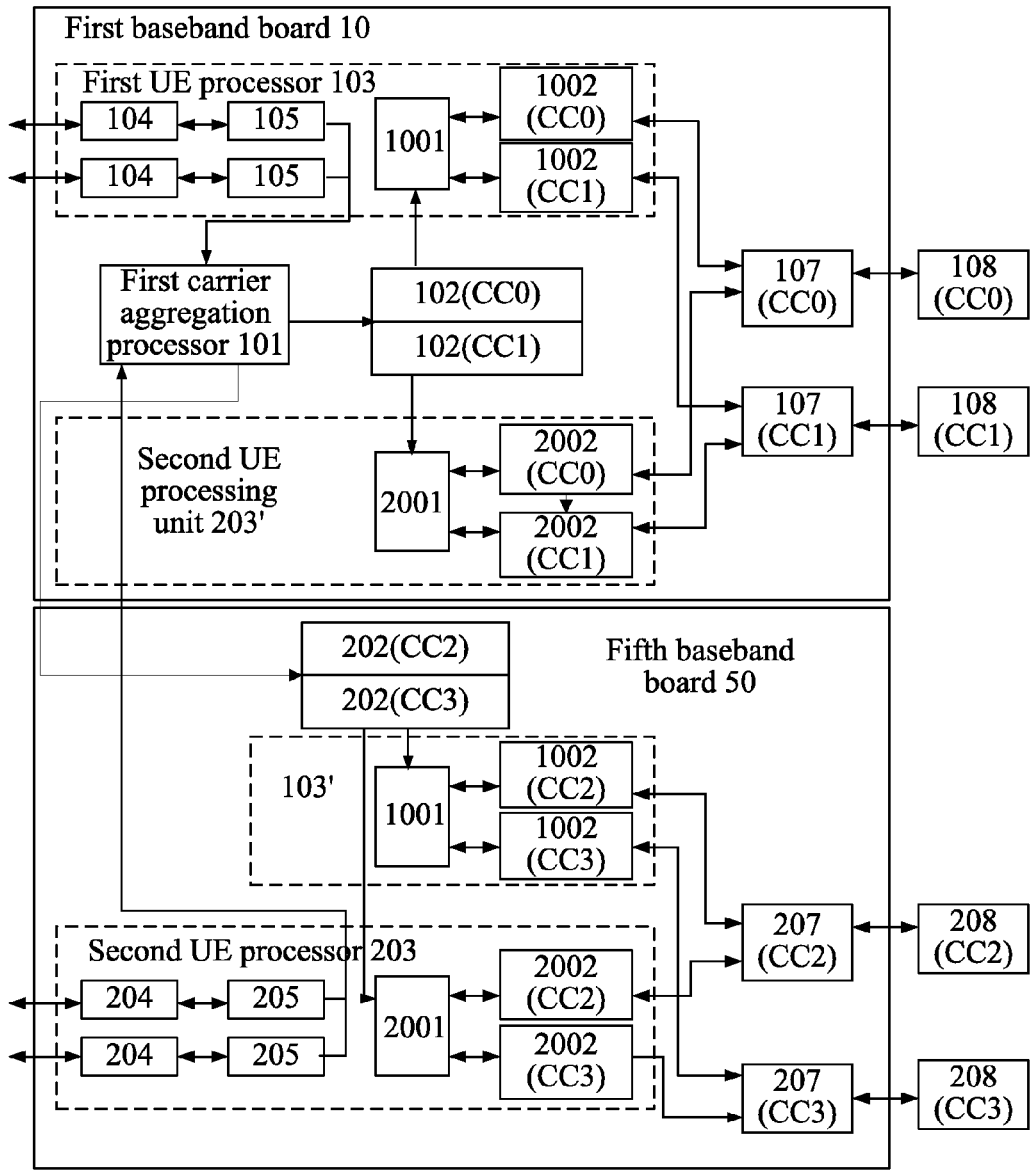
FIG. 6 is a schematic structural diagram of a carrier aggregation scheduling apparatus according to a sixth embodiment of the present invention.

In a sixth embodiment of the present invention, as shown in FIG. 6, the first baseband board 10 in the carrier aggregation scheduling apparatus 1 may further include a second UE processing unit 203', connected to the first carrier sub-scheduler 102 and configured to process user information of a second UE, where the second UE processing unit 203' includes a second media access control MAC unit, configured to receive the information of the second UE and process the information of the second UE, where a first end of the second MAC unit is connected to the first carrier sub-scheduler 102, and a second end of the second MAC unit is connected to the baseband processing unit 107.

In this embodiment, the carrier aggregation scheduling apparatus 1 may further include a fifth baseband board 50, including a second UE processor 203, configured to acquire the user information of the second UE, where the second UE processor 203 is connected to the first carrier aggregation processor 101, so that the first carrier aggregation processor 101 is enabled to schedule the carriers according to the user information of the second UE, the carrier information for carrier aggregation, and information about the fifth baseband board and determine carriers used for the second UE.

Alternatively, the fifth baseband board 50 further includes a first UE processing unit 103', configured to process the user information of the first UE, and a second carrier sub-scheduler 202, connected to the first carrier aggregation processor 101, the first UE processing unit 103', and the second UE processor 203, where the second carrier sub-scheduler 202 is configured to schedule carrier resources of a second carrier according to the scheduling result of the first carrier aggregation scheduler 101, and the carriers used for the first UE or the second UE include the first carrier and/or the second carrier.

In this embodiment, the fifth baseband board 50 may further include a packet data convergence protocol PDCP unit 204, a radio link control RLC unit 205, a media access control MAC unit, and a baseband processing unit 207 as described in the third embodiment.

In this embodiment, the first UE processing unit 103' may further include a first media access control MAC unit, configured to receive the information of the first UE and process the information of the first UE, where a first end of the first MAC unit is connected to the second carrier sub-scheduler 202, and a second end of the first MAC unit is connected to the baseband processing unit 207.

The following describes this embodiment in detail with reference to a processing procedure, where the baseband boards process four carriers (called CC0-CC3 respectively), the first baseband board 10 processes CC0 and CC1, and the fifth baseband board 50 processes CC2 and CC3.

The processing procedure in the downlink direction is as follows.

The first carrier aggregation scheduler 101 schedules and collects the amount of data to be transmitted that is specifically borne by different UEs (the first UE and the second UE), downlink air interface channel quality of the different UEs, bandwidth of different carriers, the load information of the first baseband board 10, and load information of the fifth baseband board 50, and then distributes the amount of data to be transmitted of each of the UEs to the different carriers for scheduling.

For the above deployment, information such as the amount of data to be transmitted of the second UE, the downlink air interface channel quality information of the first UE and the second UE on CC2/CC3, and the load bandwidth of CC2/CC3 on the fifth baseband board 50 needs to be transmitted to the first carrier aggregation scheduler 101 in an inter-board mode. The first carrier aggregation scheduler 101 may acquire information such as the amount of data to be transmitted of the first UE, the downlink air interface channel quality information of the first UE and the second UE on CC0/CC1, and the load bandwidth of CC0/CC1 on the first baseband board 10 in a memory sharing or message mode.

The scheduling result of the first carrier aggregation scheduler 101 is provided for each of the carrier sub-schedulers to independently schedule carrier resources. Each of the carrier sub-schedulers may need to input the following information for scheduling each of the carriers: the air interface channel quality of each of the UEs, the amount of data to be transmitted that is allocated by each of the UEs to each of the carriers, the scheduling priority of each of the UEs, the capability information of each of the UEs, and the carrier information.

The carrier sub-scheduler of CC0/CC1 does not need to perform inter-board transmission when acquiring channel information of different UEs on CC0/CC1, and the carrier sub-scheduler of CC2/CC3 also does not need to perform inter-board transmission when acquiring channel information of different UEs on CC2/CC3. However, the carrier sub-scheduler of CC2/CC3 needs to perform inter-board transmission when acquiring the amount of data to be transmitted of the first UE.

The scheduling results of the carrier sub-schedulers are provided for the RLC layers or the RLC and PDCP layers of the first UE and the second UE to perform packet processing, form the RLC PDU information, and then transmit the RLC PDU information to the MAC units of the different UEs for multiplexing and HARQ processing. The scheduling results of the carrier sub-schedulers are all need to be transmitted in an inter-board mode. For example, the carrier sub-scheduler 202 of CC0/CC1 needs to perform inter-board transmission for scheduling of the second UE, and the carrier sub-scheduler 102 of CC2/CC3 also needs to perform inter-board transmission for scheduling of the first UE.

The MAC unit of the UE multiplexes, on each of the carriers, one or multiple pieces of RLC PDU information of the UE and generates MAC PDU information on each of the carriers. Different carriers have independent HARQ units to complete HARQ processing.

For the above deployment, the RLC PDU information generally needs to be transmitted between boards. For example, the RLC PDU information of the first UE needs to be transmitted to the MAC unit in the first UE processing unit on the fifth baseband board 50 according to the scheduling result of the carrier sub-scheduler of CC2/CC3, and the RLC PDU information of the second UE needs to be transmitted to the MAC unit in the second UE processing unit on the first baseband board 10 according to the scheduling result of CC0/CC1.

The MAC PDU information of the UE on different carriers is transmitted to the different baseband processing units (107/207) for processing.

For the above deployment, the MAC PDU information does not need to be transmitted between boards. For example, information related to HARQ processing of the first UE on CC0/CC1 does not need to be transmitted to the baseband processing unit of the first baseband board 10 in an inter-board mode.

The processing procedure in the uplink direction is as follows.

The first carrier aggregation scheduler 101 collects the amount of data to be transmitted that is specifically borne by different UEs (the first UE and the second UE), uplink air interface channel quality of the different UEs, capability information of the different UEs, bandwidth of different carriers, the load information of the first baseband board 10, and the load information of the fifth baseband board 50, and then distributes the amount of data to be transmitted of each of the UEs and uplink power of the UEs to the different carriers for scheduling.

For the above deployment, information such as the amount of data to be transmitted of the second UE, the capability information of the second UE, the uplink air interface channel quality information of the first UE and the second UE on CC2/CC3, and the load bandwidth of CC2/CC3 on the fifth baseband board 50 needs to be transmitted to the first carrier aggregation scheduler 101 in an inter-board mode. The first carrier aggregation scheduler 101 may acquire information such as the amount of data to be transmitted of the first UE, the uplink air interface channel quality information of the first UE and the second UE on CC0/CC1, the capability information of the first UE, and the bandwidth of CC0/CC1 on the first baseband board 10 in a memory sharing or message mode.

The scheduling result of the first carrier aggregation scheduler 101 is provided for each of the carrier sub-schedulers to independently schedule carrier resources. Each of the carrier sub-schedulers may need to input the following information for scheduling each of the carriers: the air interface channel quality of each of the UEs, the amount of data to be transmitted that is allocated by each of the UEs to each of the carriers, the available power allocated by each of the UEs to each of the carriers, the scheduling priority of each of the UEs, the capability information of each of the UEs, and the carrier information.

The carrier sub-scheduler of CC0/CC1 does not need to perform inter-board transmission when acquiring channel information of different UEs on CC1/CC2, and the carrier sub-scheduler of CC2/CC3 also does not need to perform inter-board transmission when acquiring channel information of different UEs on CC2/CC3. However, the carrier sub-scheduler of CC2/CC3 needs to perform inter-board transmission when acquiring results of allocating the amount of data to be transmitted and the power of the first UE.

The scheduling result of the carrier sub-scheduler of CC0/CC3 is transmitted to different UEs through an air interface, so that the UE is enabled to bear RLC PDU information on different carriers. Different UEs may acquire uplink data sent by the base station by using the PBRs configured for the UEs, the BSRs reported by the UEs, or the SRs reported by the UEs. The carrier sub-scheduler 202 of CC2 needs to transmit the scheduling result of the first UE between boards, whereas the carrier sub-scheduler 102 of CC0 does not need to transmit the scheduling result of the first UE between boards.

The baseband processing units (107/207) parse the uplink data of the UE and then send the uplink data to the first and second UE processors (103/203) for processing. Different carriers have independent HARQ units to complete HARQ processing.

For the above deployment, the MAC PDU information does not need to be transmitted between boards. The PUCCH information needs to be transmitted between boards, which may be implemented in two manners: the baseband processing unit directly sends the PUCCH information to the corresponding HARQ unit of the UE; or the baseband processing unit directly sends the PUCCH information to the corresponding UE processor, and then the UE processor forwards the PUCCH information to the appropriate baseband board.

The RLC PDU information of the UE on different carriers that is obtained after processing by a demultiplexing unit is sent to the RLC unit for processing. For the above deployment, the RLC PDU information needs to be transmitted between boards. For example, the RLC PDU information uploaded by CC2 of the first UE needs to be transmitted to the first baseband board 10 in an inter-board mode.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and dynamically balance bandwidth allocation, thereby maximizing the bandwidth utilization.

Figure 7:
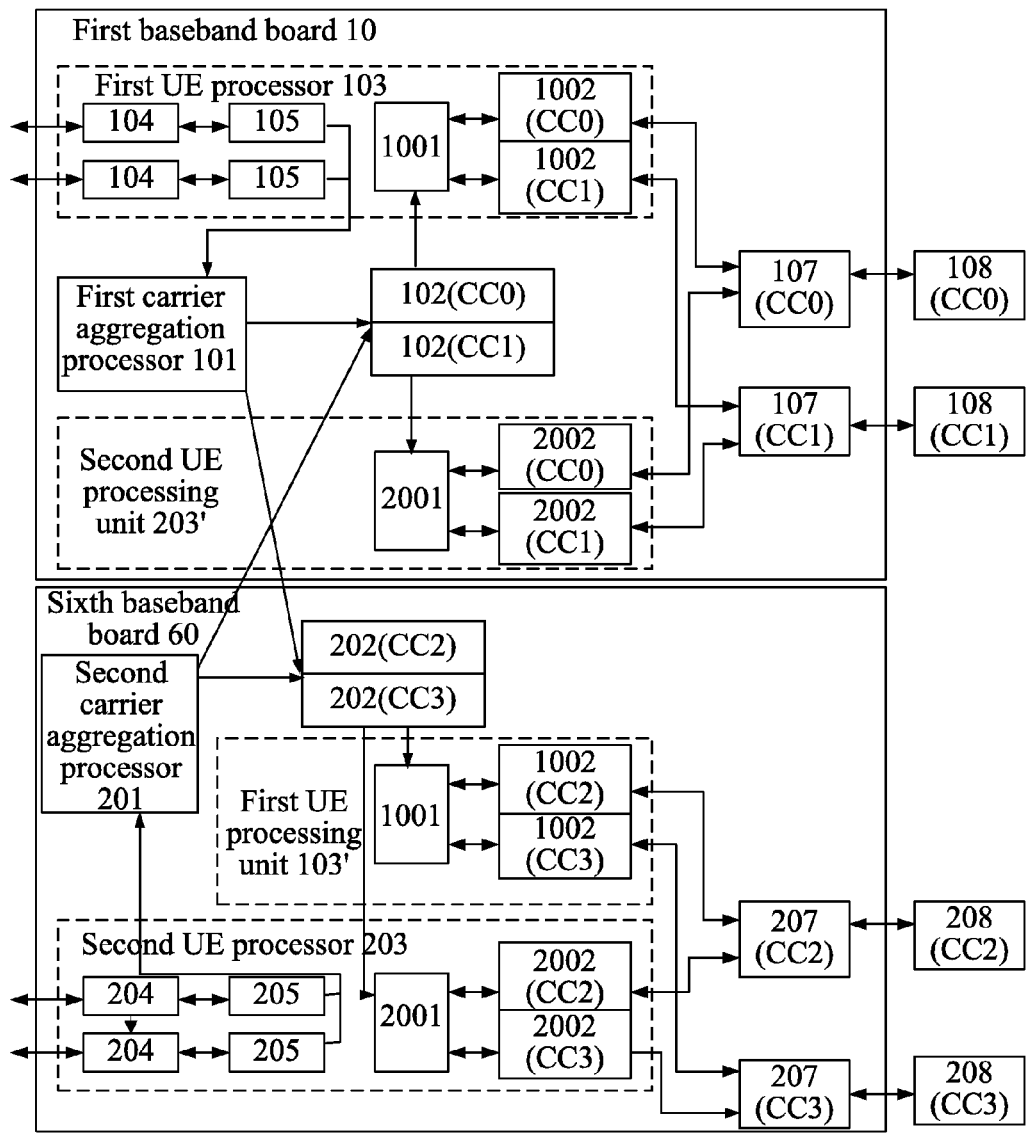
FIG. 7 is a schematic structural diagram of a carrier aggregation scheduling apparatus according to a seventh embodiment of the present invention.

In a seventh embodiment of the present invention, as shown in FIG. 7, the carrier aggregation scheduling apparatus 1 may further include a sixth baseband board 60, including a second UE processor 203, configured to acquire user information of a second UE, and a second carrier aggregation scheduler 201, connected to the second UE processor 203, and configured to schedule the carriers according to the user information of the second UE, the carrier information for carrier aggregation, and information about the sixth baseband board and determine carriers used for the second UE.

Alternatively, the sixth baseband board 60 further includes a first UE processing unit 103', configured to process the user information of the first UE, and a second carrier sub-scheduler 202, connected to the first carrier aggregation processor 101, the second carrier aggregation scheduler 102, the first UE processing unit 103', and the second UE processor 203, where the second carrier sub-scheduler 202 is configured to schedule carrier resources of a second carrier according to scheduling results of the first carrier aggregation scheduler 101 and the second carrier aggregation scheduler 102, and the carriers used for the first UE or the second UE include the first carrier and/or the second carrier.

Alternatively, the first carrier sub-scheduler 101 is connected to the second carrier aggregation scheduler 102 and further configured to schedule resources of the first carrier according to the scheduling result of the second carrier aggregation scheduler 102.

In this embodiment, when multiple second UE processors 203 are provided, each of the second UE processors 203 is connected to the second carrier aggregation scheduler 201, so that the second carrier aggregation scheduler 201 is enabled to receive the user information of each of the UEs, schedule the different carriers according to the user information of each of the UEs, the carrier information for carrier aggregation, and the information about the baseband board, and determine carriers used for the different UEs.

In this embodiment, the sixth baseband board 60 may further include a packet data convergence protocol PDCP unit 204, a radio link control RLC unit 205, a media access control MAC unit, and a baseband processing unit 207 as described in the third embodiment. Different from the third embodiment, in the downlink, the RLC unit 205 is connected to the second carrier aggregation processor 201.

In this embodiment, for the first UE processing unit 103', reference may be made to the related description in the fifth embodiment and the details are not provided herein.

The difference between the processing procedure in the downlink direction in this embodiment and that in the fifth embodiment lies in that the first carrier aggregation scheduler 101 and the second carrier aggregation scheduler 201 respectively schedule and collect the amount of data to be transmitted that is specifically borne by different UEs (the first UE and the second UE), downlink air interface channel quality of the different UEs, bandwidth of different carriers, the load information of the first baseband board 10, and load information of the sixth baseband board 60, and then distribute the amount of data to be transmitted of each of the UEs to the different carriers for scheduling.

For the above deployment, information such as the downlink air interface channel quality information of the first UE on CC2/CC3 and the load bandwidth of CC2/CC3 on the sixth baseband board 60 needs to be transmitted to the first carrier aggregation scheduler 101 in an inter-board mode. Information such as the downlink air interface channel quality information of the first UE on CC0/CC1 and the load bandwidth of CC0/CC1 on the first baseband board 10 needs to be transmitted to the second carrier aggregation scheduler 201 in an inter-board mode.

The difference between the processing procedure in the uplink direction in this embodiment and that in the fifth embodiment lies in that the first carrier aggregation scheduler 101 and the second carrier aggregation scheduler 201 collect the amount of data to be transmitted that is specifically borne by different UEs (the first UE and the second UE), uplink air interface channel quality of the different UEs, capability information of the different UEs, bandwidth of different carriers, the load information of the first baseband board 10, and the load information of the sixth baseband board 60, and then distribute the amount of data to be transmitted of each of the UEs and uplink power of the UEs to the different carriers for scheduling.

For the above deployment, information such as the air interface channel quality information of the first UE on CC2/CC3 and the load bandwidth of CC2/CC3 on the sixth baseband board 60 needs to be transmitted to the first carrier aggregation scheduler 101 in an inter-board mode. Information such as the air interface channel quality information of the second UE on CC0/CC1 and the load bandwidth of CC0/CC1 on the first baseband board 10 needs to be transmitted to the second carrier aggregation scheduler 201 in an inter-board mode.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and dynamically balance bandwidth allocation, thereby maximizing the bandwidth utilization.

Figure 8:
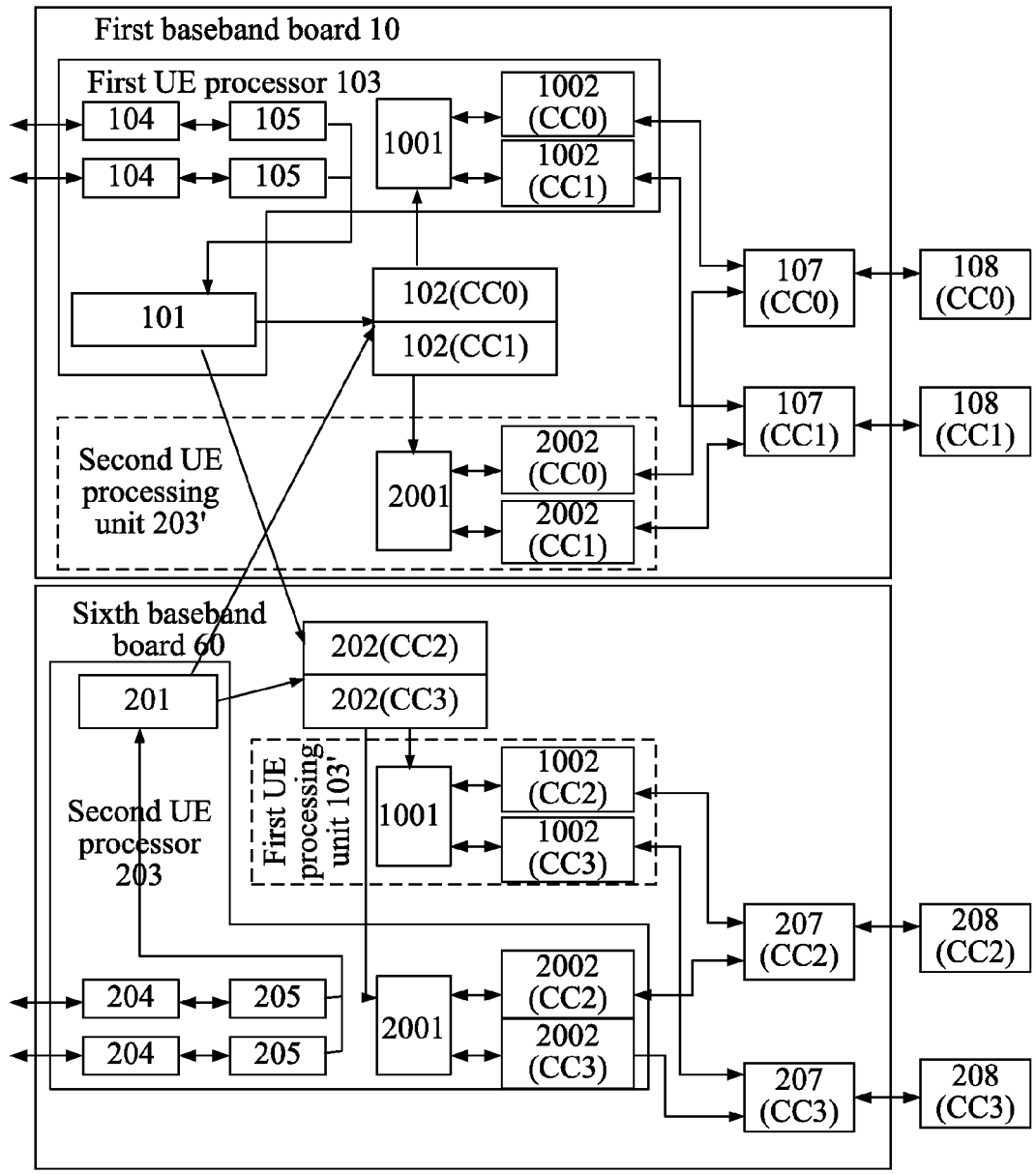
FIG. 8 is a schematic structural diagram of a carrier aggregation scheduling apparatus according to an eighth embodiment of the present invention.

In an eighth embodiment of the present invention, as shown in FIG. 8, the difference between the carrier aggregation scheduling apparatus 1 and that in the seventh embodiment lies in that the second carrier aggregation scheduler 201 is located on the second UE processor 203, and configured to schedule the carriers according to the user information of the second UE, the carrier information for carrier aggregation, and the information about the sixth baseband board and determine carriers used for the second UE.

In this embodiment, the carrier aggregation schedulers and the carrier sub-schedulers may schedule and allocate bandwidth on carriers in a distributed mode according to the acquired scheduling result, and by using two-level scheduling, break a processing bottleneck and reduce the amount of information that is transmitted between boards at a high speed, so as to adapt to change of the bandwidth requirement of the UE and dynamically balance bandwidth allocation, thereby maximizing the bandwidth utilization. In addition, carrier aggregation schedulers are configured on different UE processors, which may further reduce the processing capability requirement of each of the carrier aggregation schedulers, and load balance between baseband boards is achieved through symmetric deployment of the different baseband boards.

Figure 9:
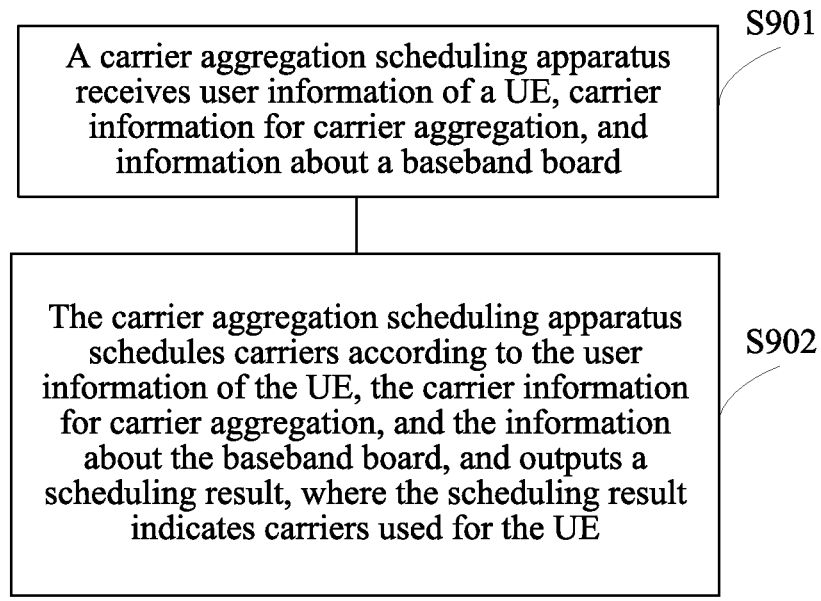
FIG. 9 is a flow chart of a carrier aggregation scheduling method according to a ninth embodiment of the present invention.

A ninth embodiment of the present invention, as shown in FIG. 9, provides a carrier aggregation scheduling method, including the following steps.

S901: A carrier aggregation scheduling apparatus receives user information of a UE, carrier information for carrier aggregation, and information about a baseband board.

S902: The carrier aggregation scheduling apparatus schedules carriers according to the user information of the UE, the carrier information for carrier aggregation, and the information about the baseband board, and outputs a scheduling result, where the scheduling result indicates carriers used for the UE.

Alternatively, the carrier aggregation scheduling apparatus schedules carrier resources of a first carrier according to the scheduling result, where the carriers used for the UE include the first carrier.

Alternatively, the scheduling result includes the amount of data to be transmitted of the UE that is allocated to the carriers.

Alternatively, the user information of the UE includes the amount of data to be transmitted of the UE and air interface channel quality of the UE.

The carrier information for carrier aggregation includes bandwidth of a carrier.

The information about the baseband board includes load of the baseband board or a resource constraint of the baseband board.

Alternatively, the carrier aggregation scheduling apparatus is a baseband board.

The method in this embodiment may be implemented by the carrier aggregation scheduling apparatus in each of the foregoing embodiments. For example, the carrier aggregation scheduler 101 may be configured to implement S101 and S102 in the ninth embodiment, the carrier sub-scheduler 102 may be configured to schedule the carrier resources of the first carrier according to the scheduling result, and the first UE processor 103 may be configured to acquire the user equipment of the first UE.

In this embodiment, the carrier aggregation scheduling apparatus may collect the user information of the UE, the carrier information for carrier aggregation, and the information about the baseband board, and dynamically schedule and allocate by time different carriers according to availability of base station resources, so as to adapt to change of the bandwidth requirement of the UE and dynamically balance bandwidth allocation, thereby maximizing the bandwidth utilization.

Figure 10:
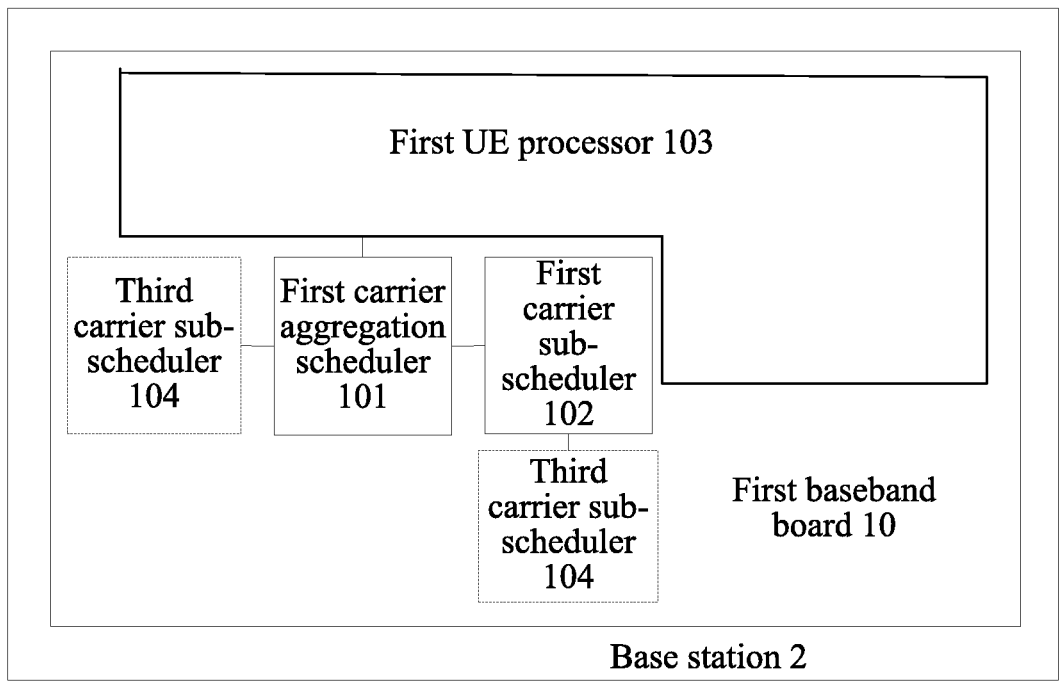
FIG. 10 is a schematic structural diagram of a base station according to a tenth embodiment of the present invention.

A tenth embodiment of the present invention provides a base station 2, the main structure of which is shown in FIG. 10 and includes a first baseband board 10, configured to acquire user information of a first user equipment UE, and a first carrier aggregation scheduler 101, configured to receive the user information of the first UE, carrier information for carrier aggregation, and information about the first baseband board, schedule carriers according to the user information of the first UE, the carrier information for carrier aggregation, and the information about the first baseband board, and output a scheduling result, where the scheduling result indicates carriers used for the first UE.

Alternatively, the base station 2 further includes a first carrier sub-scheduler 102, connected to the first carrier aggregation scheduler 101, where the first carrier sub-scheduler 102 is configured to schedule carrier resources of a first carrier according to the scheduling result of the first carrier aggregation scheduler 101, and the carriers used for the first UE include the first carrier.

Alternatively, the base station further includes a third carrier sub-scheduler 104, connected to the first carrier aggregation scheduler 101 or the first carrier sub-scheduler 102, where the third carrier sub-scheduler 104 is configured to schedule carrier resources of a third carrier according to the scheduling result of the first carrier aggregation scheduler 101, and the carriers used for the first UE include the third carrier.

Alternatively, the first baseband board 10 further includes a first user equipment UE processor 103, configured to acquire the user information of the first UE, where the first UE processor is connected to the first carrier aggregation scheduler.

Alternatively, the first carrier aggregation scheduler 101, the first carrier sub-scheduler 102, and the third carrier sub-scheduler 104 may all be located in the first baseband board 10.

Alternatively, the first carrier aggregation scheduler 101 is located in the first baseband board 10 or in the first UE processor 103.

For the first baseband board, the first UE processor, the first carrier aggregation scheduler, the first carrier sub-scheduler, and the third carrier sub-scheduler in the based station of this embodiment, reference may be made to the description about the carrier aggregation scheduling apparatus in each of the foregoing embodiments, and the details are not provided herein.

In this embodiment, the carrier aggregation scheduler in the base station may collect the user information of the UE, the carrier information for carrier aggregation, and the information about the baseband board, and dynamically schedule and allocate by time different carriers according to availability of base station resources, so as to adapt to change of the bandwidth requirement of the UE and dynamically balance bandwidth allocation, thereby maximizing the bandwidth utilization.

An eleventh embodiment of the present invention provides a base station, the main structure of which includes a carrier aggregation scheduling apparatus, configured to allocate carriers to a user equipment UE and transmit data between the UE and the base station based on the carriers, and a radio frequency processing unit, configured to process the data.

For the carrier aggregation apparatus in the base station of this embodiment, reference may be made to the description about the carrier aggregation scheduling apparatus in each of the foregoing embodiments, and the details are not provided herein.

In this embodiment, the carrier aggregation scheduling apparatus may collect the user information of the UE, the carrier information for carrier aggregation, and the information about the baseband board, and dynamically schedule and allocate by time different carriers according to availability of base station resources, so as to adapt to change of the bandwidth requirement of the UE and dynamically balance bandwidth allocation, thereby maximizing the bandwidth utilization.

Persons of ordinary skill in the art should understand that all or a part of the processes of the methods in the embodiments may be implemented by a program instructing relevant hardware. The program may be stored in a computer readable storage medium. When the program is run, the processes of the methods in the embodiments are performed. The storage medium includes: any medium that can store program codes, such as a ROM, a RAM, a magnetic disk, or an optical disk.

In the embodiments provided in the present application, it should be understood that the disclosed system, apparatus, and method may be implemented in other manners. For example, the described apparatus embodiments are merely exemplary. For example, the units are merely divided according to logical functions and can be divided in other manners in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electrical, mechanical or other forms.

The units described as separate parts may or may not be physically separated, and parts displayed as units may or may not be physical units, which may be located in one position or distributed to multiple network elements. Some or all of the units may be selected according to actual needs to achieve the objectives of the solutions of the embodiments.

In addition, functional units in the embodiments of the present invention may be integrated into a processor or exist as separate physical units, or two or more units are integrated into a unit. The integrated unit may be implemented in the form of hardware, or may be implemented in the form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to execute all or a part of the steps of the methods described in the embodiments of the present invention. The storage medium includes: any medium that can store program codes, such as a USB flash drive, a removable hard disk, a read-only memory (ROM, Read-Only Memory), a random access memory (RAM, Random Access Memory), a magnetic disk, or an optical disk.

Persons skilled in the art may understand that the modules in the apparatuses provided in the embodiments may be distributed in the apparatuses according to the description of the embodiments, or may be arranged after corresponding variations in one or multiple apparatuses which are different from those described in the embodiments. The modules in the embodiments may be combined into one module, or split into multiple submodules.

Persons skilled in the art should understand that the modules of the apparatuses according to the embodiments of the present invention are divided by functions, and in practice, the functional modules may be separated or combined for the specific structure.

The sequence numbers of the above embodiments are merely for the convenience of description, and do not imply the preference among the embodiments.

The technical solutions disclosed in the appended claims also fall within the protection scope of the embodiments of the present invention.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions in the embodiments of the present invention.

What is claimed is:

1. A carrier aggregation scheduling apparatus, comprising:
a first carrier aggregation scheduler configured to receive user information of a first user equipment (UE), carrier information for carrier aggregation, and information about a first baseband board, schedule carriers according to the user information of the first UE, the carrier information for carrier aggregation, and the information about the first baseband board, and output scheduling results for the carriers, wherein the scheduling results respectively comprise an amount of data to be transceived of the first UE that is separately allocated to the carriers;
a first carrier sub-scheduler connected to the first carrier aggregation scheduler and configured to schedule a carrier resource of a first carrier according to a received scheduling result-comprising an amount of data to be transceived of the first UE being separately allocated to the first carrier, wherein the scheduling results comprise the received scheduling result;
the first baseband board, comprising a first UE processor, the first UE processor configured to acquire the user information of the first UE, the first carrier aggregation scheduler being connected to the first UE processor and located in the first baseband board; and
a second baseband board, comprising a second UE processor connected to the first carrier aggregation scheduler, the second UE processor being configured to acquire user information of a second UE associated with the second UE processor, wherein the first carrier aggregation scheduler determines carriers used for the second UE according to the user information of the second UE, the carrier information for carrier aggregation, and information about the second baseband board.

2. The apparatus according to claim 1, wherein the first baseband board further comprises an $n^{th}$ UE processor, configured to acquire user information of an $n^{th}$ UE, wherein n comprises a positive integer; and
wherein the first carrier aggregation scheduler is connected to the $n^{th}$ UE processor and is further configured to receive the user information of the $n^{th}$ UE, to determine carriers used for the $n^{th}$ UE according to the user information of the $n^{th}$ UE, the carrier information for carrier aggregation, and the information about the first baseband board.

3. The apparatus according to claim 1, wherein the second baseband board further comprises a second carrier sub-scheduler connected to the first carrier aggregation scheduler, wherein the second carrier sub-scheduler is configured to schedule a resource of a second carrier according to a determination of the first carrier aggregation scheduler, and the carriers used for the first UE or the second UE comprise the second carrier.

4. The apparatus according to claim 1, wherein the user information of the first UE comprises an amount of data to be tranceived of the UE or air interface channel quality of the UE.

5. The apparatus according to claim 1, wherein the carrier information for carrier aggregation comprises bandwidth of a carrier.

6. The apparatus according to claim 1, wherein the information about the first baseband board comprises load of the first baseband board or a resource constraint of the first baseband board.

7. The apparatus according to claim 1, wherein the carriers determined by the first carrier aggregation scheduler are respectively allocated to proceed different portion of the amount of data to be transceived of the first UE.

8. The apparatus according to claim 1, wherein the first carrier sub-scheduler is not located in the first baseband board.

* * * * *